United States Patent
Mooij et al.

(10) Patent No.: US 7,336,789 B1
(45) Date of Patent: Feb. 26, 2008

(54) SYSTEM FOR PROVIDING ENCRYPTED DATA, SYSTEM FOR DECRYPTING ENCRYPTED DATA AND METHOD FOR PROVIDING A COMMUNICATION INTERFACE IN SUCH A DECRYPTING SYSTEM

(75) Inventors: Wilhelmus Gerardus Petrus Mooij, Duivendrecht (NL); Andrew Augustine Wajs, Haarlem (GB)

(73) Assignee: Irdeto Access B.V., Hoofddorp (NL)

( * ) Notice: Subject to any disclaimer, the term of this patent is extended or adjusted under 35 U.S.C. 154(b) by 0 days.

(21) Appl. No.: 09/763,732

(22) PCT Filed: Aug. 30, 1999

(86) PCT No.: PCT/EP99/06344

§ 371 (c)(1),
(2), (4) Date: Feb. 27, 2001

(87) PCT Pub. No.: WO00/13073

PCT Pub. Date: Mar. 9, 2000

(30) Foreign Application Priority Data

Aug. 31, 1998 (EP) ................................. 98202891

(51) Int. Cl.
*H04L 9/00* (2006.01)
(52) U.S. Cl. ...................... 380/255; 713/172; 713/193; 713/194; 726/20; 380/201; 380/255
(58) Field of Classification Search ................ 380/235, 380/35, 4, 255, 251, 201; 705/41; 710/8, 710/5; 713/172, 193, 194; 726/20
See application file for complete search history.

(56) References Cited

U.S. PATENT DOCUMENTS 5,058,162 A * 10/1991 Santon et al. .................. 705/51
5,109,152 A * 4/1992 Takagi et al. ................ 235/380
5,202,922 A * 4/1993 Iijima .......................... 380/45

(Continued)

FOREIGN PATENT DOCUMENTS

EP 0 679 980 A1 11/1995

OTHER PUBLICATIONS

International Search Report-PCT/EP99/06344, Jan. 14, 2000.

*Primary Examiner*—Nasser Moazzami
*Assistant Examiner*—Carl Colin
(74) *Attorney, Agent, or Firm*—Schwegman, Lundberg & Woessner, P.A.

(57) ABSTRACT

A system and method for providing encrypted data for use in a content player are described. The system comprises an encryption device for encrypting data using an encryption algorithm, and a protection device for providing security device data and for providing information on a protocol for communication between the content player and a secure device. The system also comprises a control device for providing protected contents containing the encrypted data and the secure device data. The protocol information and attribute data may be on the different parts inside the protected contents. The encrypted data can be transmitted or stored on a suitable medium. A system and method for decrypting encrypted data in a content player is also described. The system may comprise an input for receiving protected contents containing encrypted data, secure device data, information on a communication protocol, and attribute data on the different parts inside the protected contents.

15 Claims, 3 Drawing Sheets

U.S. PATENT DOCUMENTS

| | | | |
|---|---|---|---|
| 5,349,649 A * | 9/1994 | Iijima | 709/228 |
| 5,630,057 A | 5/1997 | Hait | |
| 5,659,615 A * | 8/1997 | Dillon | 713/162 |
| 5,911,776 A * | 6/1999 | Guck | 709/217 |
| 5,912,453 A * | 6/1999 | Gungl et al. | 235/492 |
| 5,923,884 A * | 7/1999 | Peyret et al. | 717/167 |
| 5,953,005 A * | 9/1999 | Liu | 715/500.1 |
| 5,982,891 A * | 11/1999 | Ginter et al. | 705/54 |
| 5,991,399 A * | 11/1999 | Graunke et al. | 380/279 |
| 6,005,942 A * | 12/1999 | Chan et al. | 713/187 |
| 6,052,780 A * | 4/2000 | Glover | 713/193 |
| 6,055,314 A * | 4/2000 | Spies et al. | 380/228 |
| 6,105,008 A * | 8/2000 | Davis et al. | 705/41 |
| 6,157,721 A * | 12/2000 | Shear et al. | 380/255 |
| 6,157,966 A * | 12/2000 | Montgomery et al. | 710/8 |
| 6,185,683 B1 * | 2/2001 | Ginter et al. | 713/176 |
| 6,208,335 B1 * | 3/2001 | Gordon et al. | 715/721 |
| 6,216,227 B1 * | 4/2001 | Goldstein et al. | 713/172 |
| 6,230,267 B1 * | 5/2001 | Richards et al. | 713/172 |
| 6,418,421 B1 * | 7/2002 | Hurtado et al. | 705/54 |
| 6,424,718 B1 * | 7/2002 | Holloway | 380/277 |
| 6,519,700 B1 * | 2/2003 | Ram et al. | 713/193 |
| 6,799,195 B1 * | 9/2004 | Thibault et al. | 709/203 |
| 6,868,403 B1 * | 3/2005 | Wiser et al. | 705/51 |
| 6,978,378 B1 * | 12/2005 | Koretz | 713/193 |

* cited by examiner

SYSTEM FOR PROVIDING ENCRYPTED DATA, SYSTEM FOR DECRYPTING ENCRYPTED DATA AND METHOD FOR PROVIDING A COMMUNICATION INTERFACE IN SUCH A DECRYPTING SYSTEM

The invention generally relates to a system for providing encrypted data to be used in a content player, to a system for decrypting encrypted data in a content player, and to a method for providing a communication interface between a decryption device and a secure device in a content player. More particularly the invention relates to such systems and a method to create an open access interface for a wide range of multimedia terminals.

In the present specification the term "content player" is meant to indicate any type of consumer equipment, such as a (digital) TV set, a set top box, a DVD player or a (digital) VCR. In order to allow access to contents, such as a movie, football match, etc., it is known to protect the contents by encryption of the data using a suitable encryption algorithm. Subscribers are provided with a set top box for example and a secure device, wherein the secure device generates information necessary to decrypt the encrypted data. Conventional systems of this type are provided with a fixed interface and protocols for communication between the secure device and the content player. A fixed interface shows the disadvantage that the content player can only be used with one or more specific secure devices.

The invention aims to provide systems and a method of the above-mentioned type allowing to create a variable interface between the secure device and a content player.

According to a first aspect of the invention, a system for providing encrypted data to be used in the content player is provided, comprising an encryption device for encrypting data using an encryption algorithm, a protection device for providing secure device data, and for providing information on a protocol for communication between the content player and a secure device, and a control device for providing a protected contents containing the encrypted data, the secure device data, said protocol information and attribute data on the different parts inside the protected contents.

According to a second aspect of the invention, a system for decrypting encrypted data in a content player is provided, comprising an input for receiving a protected contents containing the encrypted data, secure device data, information on a protocol for communication between the content player and a secure device, and attribute data on the different parts inside the protected contents, a decryption device and a control device, wherein the control device is programmed to use said protocol information to establish a communication interface between the decryption device and a secure device used with the contents player, wherein the decryption device is adapted to communicate with the secure device as controlled by the protocol information to obtain information required to decrypt the encrypted data.

According to a further aspect of the invention, a method for providing a communication interface between a decryption device in a content player and a secure device is provided, comprising receiving a protected contents containing information on a protocol for communication between the content player and a secure device, and attribute data on the different parts inside the protected contents, retrieving said protocol information from the protected contents to establish a communication interface between the decryption device and a secure device used with the contents player.

According to a still further aspect of the invention a method for transmitting or the like of encrypted data is provided, wherein the encrypted data is obtained by means of the system for providing encrypted data according to the invention.

In this manner the invention provides a variable interface platform, wherein any communication interface between a secure device and content player can be established. The invention allows content protection technology to be adapted and to maintain interoperability with existing technology used in present consumer equipment. In this manner backwards compatibility in content protection systems and secure device interfaces is obtained.

The invention will be further explained by reference to the drawings in which an embodiment of the systems of the invention applying the method of the invention are shown in a schematical manner.

Figure 1:
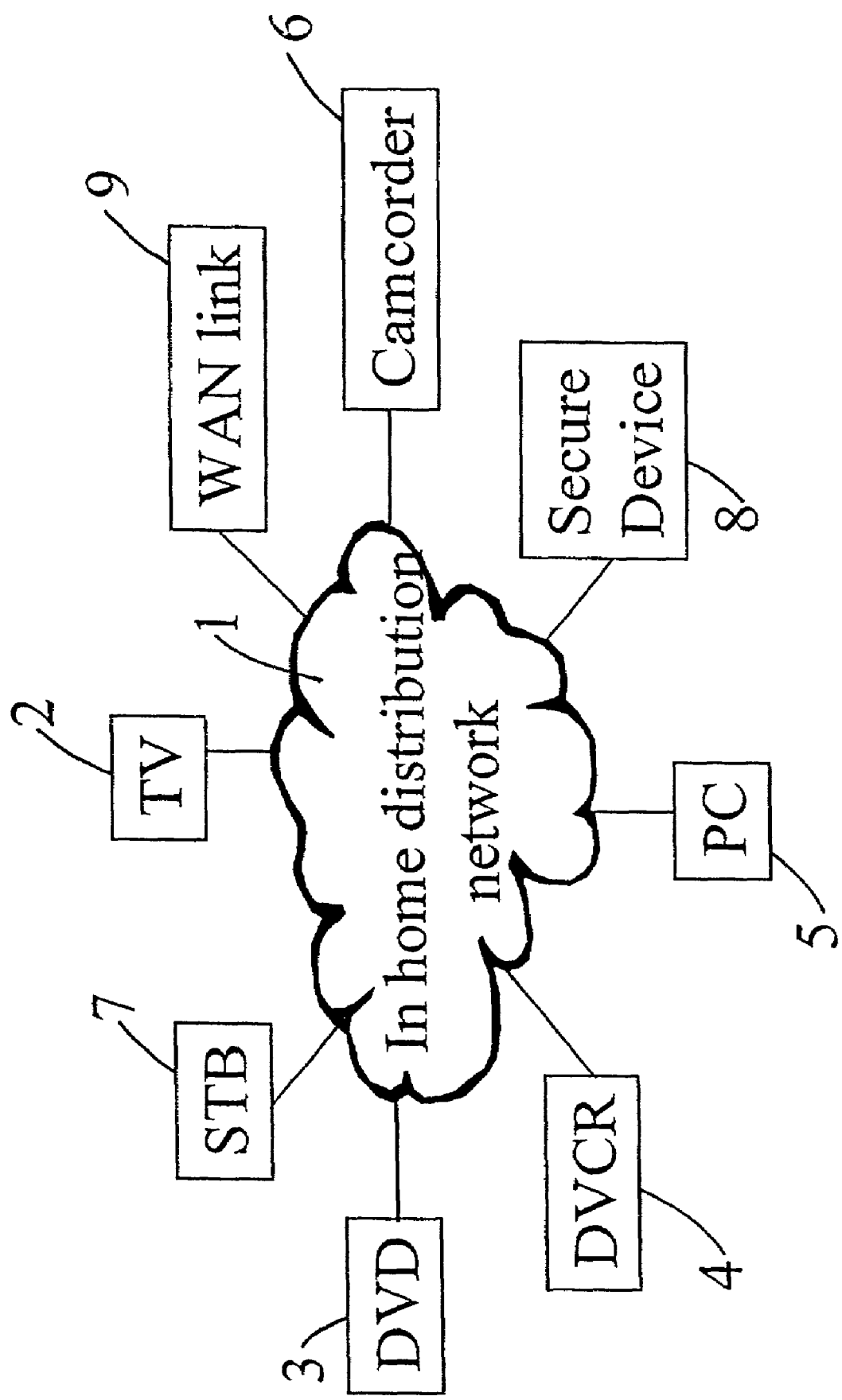
FIG. 1 shows an in-home distribution network interconnecting a number of consumer content players.

By way of example FIG. 1 shows an in-home distribution network 1 interconnecting a plurality of content player devices such as a TV set 2, a DVD player 3, a DVCR 4 and a PC 5. Further a camcorder 6, a set top box (STB) 7 and a secure device 8, such as for example a smart card, are connected to the network 1. Finally the network is linked to a wide area network, such as the internet, as indicated by reference numeral 9. In this example of an in-home distribution network 1, the STB 7 and the secure device 8 communicate through a communication interface in order to decrypt any encrypted data obtained from protected contents as will be described later. The STB 7 and secure device 8 are common to the content players 2-5 in this example, although it is also possible that each of the content players is provided with its own decoder/decryption device communicating with its own secure device. It is noted that protected contents can be moved through the network 1 to a target content player using a suitable protocol and addressing technique which are not part of the present invention.

Figure 2:
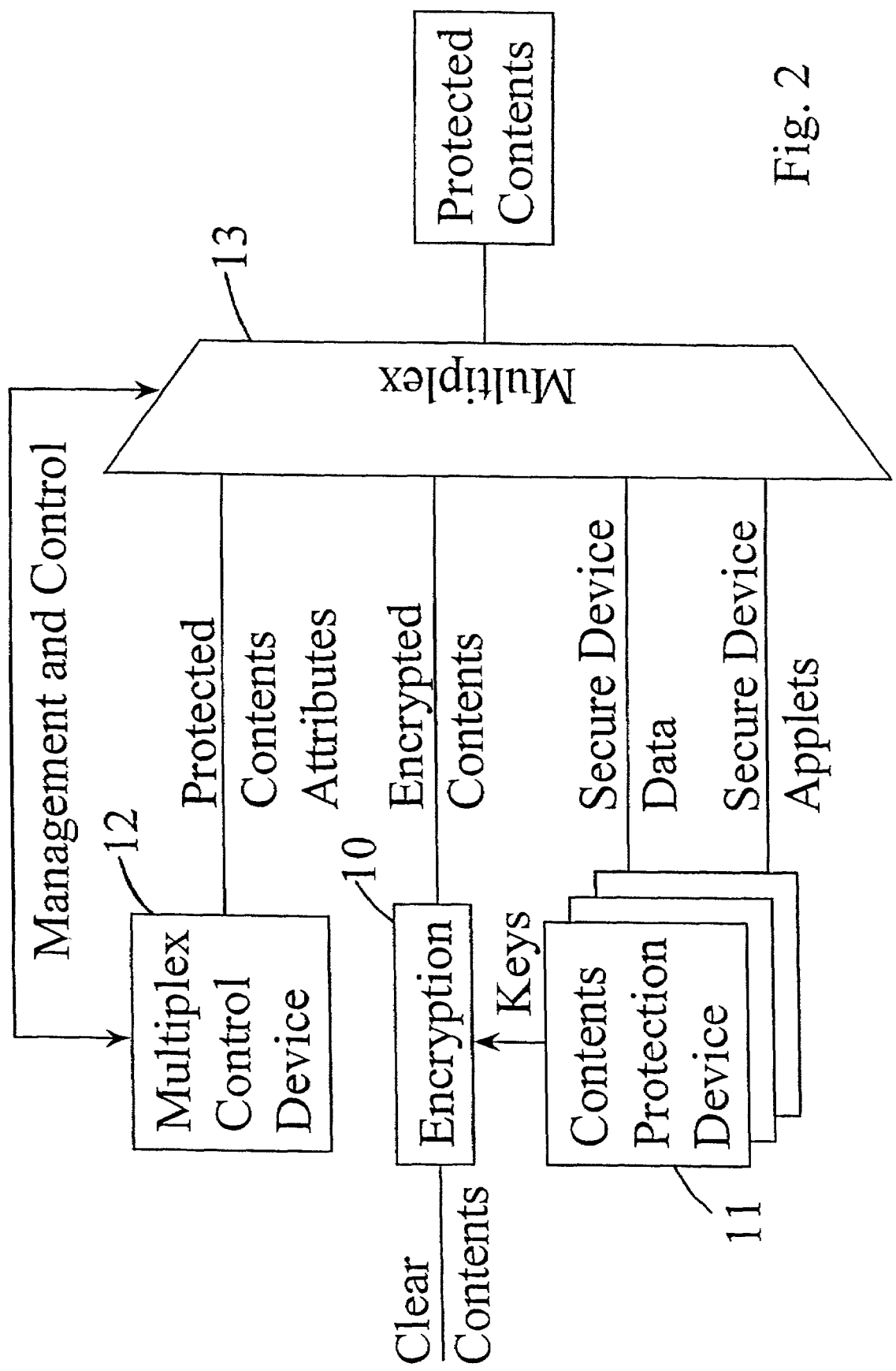
FIG. 2 shows a diagram of the architecture of an embodiment of the system for providing encrypted data to be used in a content player according to the invention.

FIG. 2 shows a system for providing encrypted data to be used in a content player, comprising an encryption device 10, a protection device 11 and a control device 12 including a multiplexer 13. Clear contents, such as a movie, a football match, etc., is encrypted in the encryption device 10 using a suitable encryption algorithm. In the encryption algorithm keys are used which are provided by the protection device 11 and these keys are themselves encrypted in one or more formats by the protection device 11. The encrypted keys are provided as secure device data. The protection device 11 further provides information on a protocol for communication between the content player and the secure device 8. In the embodiment shown, the information on the protocol and encryption format(s) is provided as one or more secure device applets.

The encrypted contents provided by the encryption device, the secure device applet(s) and the secure device data are multiplexed into protected contents, also containing attribute data provided by the control device 12. The attribute data are required to find the relevant parts inside the protected contents structure. The output of the multiplexer 13 can be broadcast for example or stored on a suitable medium for later use.

The system shown in FIG. 2 may be adapted to handle one or more different secure device formats and for each of these formats the protection device 11 provides a secure device applet. The main function of the secure device applet is to implement in the content player the protocol and format to communicate with the secure device connected to the content player. In this manner it is possible to provide an interface between the secure device and the content player without specific knowledge beforehand of the protocol required by the specific secure device used.

Preferably each secure device applet is authenticated, for example by a signature which shows that it originated from a legitimate source. Suitable public key cryptographic hashing functions can be used.

Figure 3:
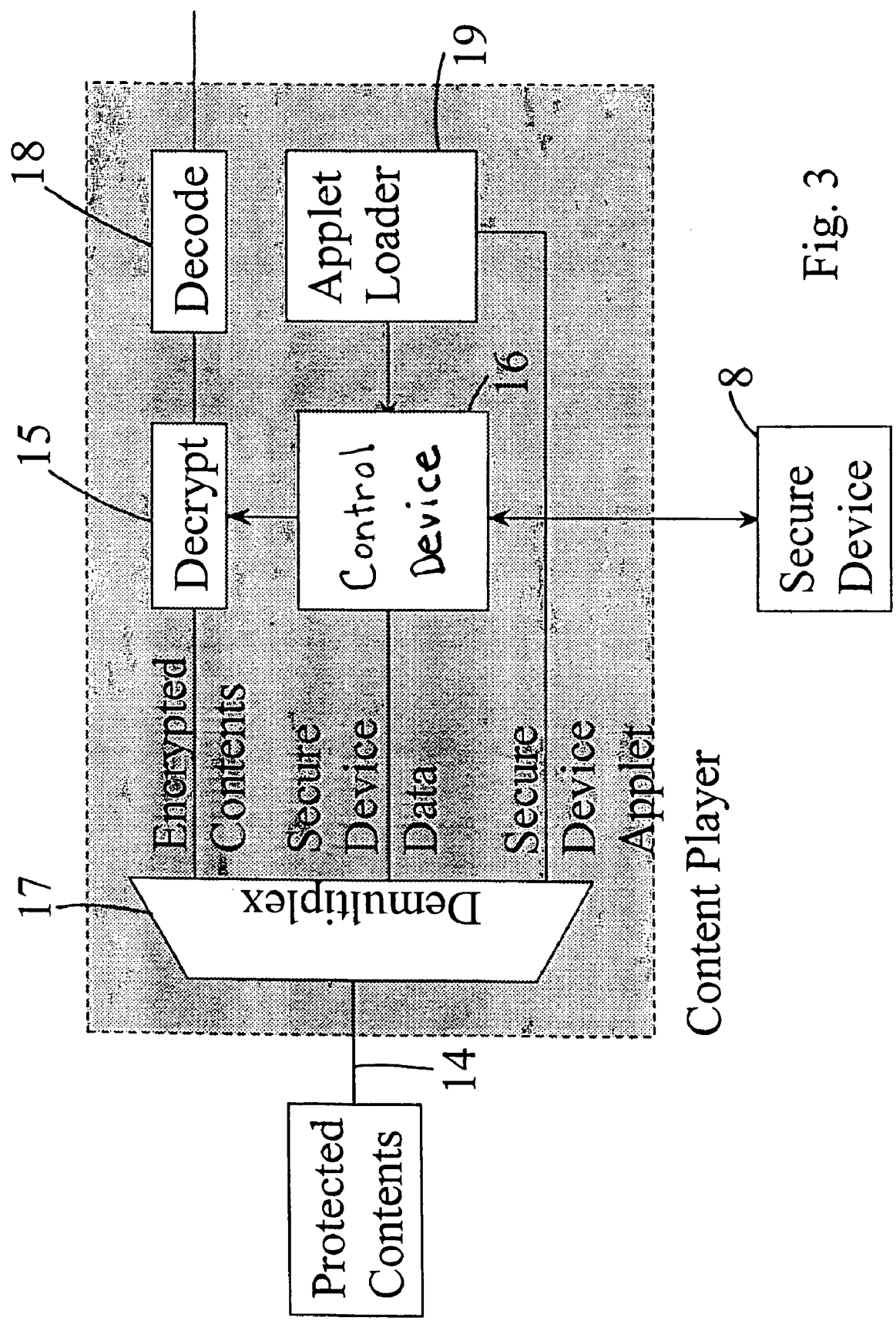
FIG. 3 shows a diagram of the architecture of an embodiment of the system for decrypting encrypted data in a content player according to the invention.

FIG. 3 shows a system for decrypting encrypted data in a content player as shown, comprising an input 14 for receiving protected contents, a decryption device 15 and a control device 16 including a demultiplexer 17. A secure device 8 is connected to the control device 16. Further a decoder 18 is shown for decoding decrypted data in a manner known per se. The decoder 18 is not part of the present invention. The attribute data is used in the control device 16 to demultiplex the protected contents to retrieve a secure device applet or applets, the secure device data and the encrypted contents and to forward the respective parts of the contents to the corresponding components of the content player.

In order to decrypt the encrypted contents, the content player needs to retrieve the keys from the secure device 8. To this end the control device 16 determines the type of secure device 8 connected to the content player and searches the attribute data to select the appropriate corresponding security device applet. The control device 16 includes an applet loader 19 to verify the signature of the secure device applet. If the secure device applet is verified, this applet is downloaded in a virtual machine programmed into the control device and is executed in this environment to establish a communication interface between the secure device 8 and the content player and decryption device 15. Once the communication interface is established, the secure device applet operates to fetch the secure device data from the protected contents which is transformed by the secure device 8 into the keys required by the decryption device 15 to decrypt the encrypted contents.

As noted, the applet loader 19 verifies whether the secure device applet is an authentic one. In this manner the applet loader restricts access to the virtual machine to those applets originating from an authentic source. A standard method to achieve verifying of the secure device applet is authentication using a public key cryptographic hashing function. Optionally, the applet may be encrypted using a conventional secret key cryptographic algorithm. The attribute data contains fields specifying both the type of cryptographic algorithm and secret key index to be used in the signature verification process.

In the virtual machine, the secure device applet uses a content player application program interface to communicate with the content player on the one side and a security application program interface to communicate with the secure device 8 and the decryption device 15.

The control device 12 is arranged to indicate in the attribute data the type of secure device 8 supported in the content player. When the secure device 8 has been determined, for example by finding the unique identifier in a manner known per se, the secure device applet corresponding with the secure device by virtue of having a matching identifier is selected from the attribute data. On the basis of this information, the applet loader retrieves the secure device applet from the protected contents. This process will generally be used in an application, wherein the protected contents is received in a continuous stream in case of a broadcasting environment for example. The same process can be used when the protected contents is stored on a tape or disc. In case of an broadcasting environment or wide area network, it is also possible for the applet loader 19 to request a service provider or the like to forward a secure device applet corresponding to the detected type of secure device.

It is observed that the security of the system described is at least as good as any existing security system. As the protected contents is always encrypted until it reaches the target content player, it is difficult to obtain a clear text version of the contents. Moreover the flexibility of the system described allows for defense and counter measures against presently existing attacking techniques, which counter measures are not available in existing protection systems.

It is noted that the term "content player" should be understood as to mean any device mentioned above or even a separate decoder equipment having an interface for the secure device. Further it is noted that although wording is used in the above description suggesting separate devices in the systems described, it will be clear that both the encrypting and decrypting system can be implemented by means of a microprocessor and suitable peripheral circuits operating in the manner described as controlled by suitable software.

The system described supports a wide range of applications. As already mentioned, a first application area is a broadcasting environment. The content player in this case can be a set top box connected to a TV or a DVCR. The virtual machine can be implemented using JAVA. Generally an ISO 7816 smart card is used as secure device. According to a favourable embodiment, it will also be possible for non-subscribers to buy a specific "event", such as a football match, using a standard banking card, wherein the applet loader requests the service provider to download a suitable secure device applet. Other applications are pre-recorded media, such as CD, DVD, DVCR tapes and other cassettes. In the described system of the invention, the stored protected contents includes a number of supported secure device applets, so that the applet loader of the control device can retrieve the secure device applet corresponding with the secure device used in the specific content player. In this manner again backwards compatibility is allowed, whereas future upgrades can be made in a flexible manner.

The invention is not restricted to the above-described embodiments which can be varied in a number of ways within the scope of the following claims.

The invention claimed is:

1. System for providing encrypted data to be used in a content player comprising a decryption device, comprising:
    an encryption device for encrypting data using an encryption algorithm, a protection device for providing secure device data, and for providing information on a protocol for communication between the content player and a secure device arranged to transform the secure device data into information required to decrypt the encrypted data, and a control device for providing a protected contents structure containing the encrypted data, the secure device data, said protocol information and attribute data for finding relevant parts inside the protected contents structure,
    wherein the attribute data comprises information to find in the protected contents structure information on an appropriate protocol for establishing a communication interface using said information on the appropriate protocol between the content player and the secure device for use of the secure device to transform secure device data communicated to the secure device through the communication interface into information required to decrypt the encrypted data.

2. System according to claim 1, wherein said protection device provides at least one security device applet containing said information on a protocol for communication.

3. System for decrypting encrypted data in a content player, comprising:
   an input for receiving protected contents containing encrypted data, secure device data, information on a protocol for communication between the content player and a secure device arranged to transform the secure device data into information required to decrypt the encrypted data, and attribute data for finding relevant parts inside the protected contents, a decryption device, and
   a control device,
   wherein said secure device data comprises the information required to decrypt the encrypted data, and wherein the attribute data comprises information to find in the protected contents information on an appropriate protocol for communication between the content player and the secure device for retrieving the information required to decrypt the encrypted data, wherein the control device is programmed to use the attribute data to find the appropriate protocol information to establish a communication interface using said information on the appropriate protocol between the decryption device and a secure device used with the content player,
   wherein the decryption device is suitable for communicating with the secure device as controlled by the protocol information to obtain the information required by the decryption device to decrypt the encrypted data and generated by the secure device by transforming secure device data communicated to the secure device through the communication interface.

4. System according to claim 3, wherein said information on the appropriate protocol for communication between the content player and the secure device is provided as a secure device applet, wherein the control device is programmed to operate as a virtual machine to execute the secure device applet to establish said communication interface.

5. System according to claim 4, wherein at least one secure device applet in the protected contents is authenticated, wherein the control device comprises an applet loader for verifying the authentication of a secure device applet, wherein only a verified secure device applet is loaded into the virtual machine.

6. System according to claim 5, wherein at least one secure device applet in the protected contents is encrypted, wherein the applet loader is suitable for decrypting an encrypted secure device applet.

7. System according to claim 4, wherein the virtual machine comprises a content player application program interface and a security application program interface, the secure device applet communicating with the content player and the secure device by means of said content player application program interface and said security application program interface, respectively.

8. System according to claim 4, wherein the control device is arranged to determine of which type the secure device used in the system is, wherein the control device is arranged to retrieve a secure device applet from the protected contents corresponding with the determined type of secure device.

9. System according to claim 4, wherein the system is part of a content player connected to a network, wherein the control device is arranged to determined the type of secure device used in the system, and wherein the control device is arranged to request a corresponding secure device applet to be downloaded from a service provider.

10. Method for providing a communication interface between a decryption device and a secure device in a content player, comprising:
    receiving a protected contents structure containing secure device data, information on a protocol for communication between the content player and a secure device arranged to transform the secure device data into information required to decrypt the encrypted data, and attribute data for finding relevant parts inside the protected contents structure, wherein said secure device data comprises the information required to decrypt the encrypted data, the attribute data comprising information to find in the protected contents structure information on an appropriate protocol for communication between the content player and the secure device for retrieving the information required to decrypt the encrypted data, and
    retrieving said protocol information from the protected contents structure to establish a communication interface using said information on the appropriate protocol between the decryption device and a secure device used with the contents player to transform secure device data communicated to the secure device through the communication interface into information required by the decryption device to decrypt encrypted data.

11. Method according to claim 10, wherein said protocol information is provided as a secure device applet, wherein the secure device applet is executed in a virtual machine to establish the communication interface.

12. Method according to claim 10, further comprising detecting which type of secure device is being used with the content player, and requesting corresponding protocol information or a secure device applet from a source providing the protected contents structure.

13. Method according to claim 10, further comprising detecting which type of secure device is being used with the content player, and requesting corresponding protocol information or a secure device applet from a source providing the protected contents structure.

14. Method according to claim 10, wherein said protocol information or secure device applet is authenticated, further comprising verifying the authentication, and using only verified protocol information or a verified secure device applet to establish said communication interface.

15. Method for broadcasting protected contents, comprising:
    encrypting data using an encryption algorithm,
    providing secure device data,
    providing information on a protocol for establishing a communication interface using said information on the appropriate protocol between a content player and a secure device arranged to transform the secure device data communicated to the secure device through the communication interface into information required to decrypt the encrypted data, providing protected contents containing the encrypted data, the secure device data, the protocol information and attribute data, and
    broadcasting the protected contents,
    wherein the attribute data comprises information to find in the protected contents information on an appropriate protocol for communication between the content player and the secure device.

* * * * *